(12) United States Patent
Hakura et al.

(10) Patent No.: US 10,282,803 B2
(45) Date of Patent: May 7, 2019

(54) STATE HANDLING IN A TILED ARCHITECTURE

(71) Applicant: NVIDIA CORPORATION, Santa Clara, CA (US)

(72) Inventors: Ziyad S. Hakura, Gilroy, CA (US); Pierre Souillot, San Francisco, CA (US); Cynthia Ann Edgeworth Allison, Madison, AL (US); Dale L. Kirkland, Madison, AL (US); Walter R. Steiner, Flagler Beach, FL (US)

(73) Assignee: NVIDIA CORPORATION, Santa Clara, CA (US)

( * ) Notice: Subject to any disclaimer, the term of this patent is extended or adjusted under 35 U.S.C. 154(b) by 487 days.

(21) Appl. No.: 14/016,789

(22) Filed: Sep. 3, 2013

(65) Prior Publication Data

US 2014/0118380 A1    May 1, 2014

Related U.S. Application Data

(60) Provisional application No. 61/719,271, filed on Oct. 26, 2012.

(51) Int. Cl.

| | |
|---|---|
| *G09G 5/36* | (2006.01) |
| *G06T 1/20* | (2006.01) |
| *G06T 15/00* | (2011.01) |
| *G06T 15/40* | (2011.01) |
| *G06F 9/38* | (2018.01) |
| *G06T 1/60* | (2006.01) |
| *G09G 5/395* | (2006.01) |

(Continued)

(52) U.S. Cl.
CPC ................. *G06T 1/20* (2013.01); *G06F 9/38* (2013.01); *G06F 9/44* (2013.01); *G06F 12/0808* (2013.01);

(Continued)

(58) Field of Classification Search
CPC ..... G06T 1/60; G06T 15/005; G06F 12/0875; G06F 12/0897; G09G 2360/121

(Continued)

(56) References Cited

U.S. PATENT DOCUMENTS

| | | |
|---|---|---|
| 6,323,860 B1 | 11/2001 | Zhu et al. |
| 6,535,209 B1 | 3/2003 | Abdalla et al. |

(Continued)

OTHER PUBLICATIONS

"Open GL Super Bible—The OpenGL State Machine" (published on Mar. 19, 2008).*

(Continued)

*Primary Examiner* — Gordon Liu

(74) *Attorney, Agent, or Firm* — Artegis Law Group, LLP

(57) ABSTRACT

One embodiment of the present invention includes a graphics subsystem that includes a tiling unit, a crossbar unit, and a screen-space pipeline. The crossbar unit is configured to transmit primitives interleaved with state change commands to the tiling unit. The tiling unit is configured to record an initial state associated with the primitives and to transmit to the screen-space pipeline one or more primitives in the primitives that overlap a first cache tile. The tiling unit is further configured to transmit the initial state to the screen-space pipeline and to transmit to the screen-space pipeline one or more primitives in the primitives that overlap a second cache tile. The tiling unit includes a state filter block configured to determine that a first state change in the state change commands is followed by a second state change, without an intervening primitive, and to forego transmitting the first state change in response.

25 Claims, 12 Drawing Sheets

(51) Int. Cl.
*G09G 5/00* (2006.01)
*G06T 15/50* (2011.01)
*G06F 12/0808* (2016.01)
*G06F 12/0875* (2016.01)
*G06F 9/44* (2018.01)
*G06T 15/80* (2011.01)
*G06T 17/20* (2006.01)

(52) U.S. Cl.
CPC .......... *G06F 12/0875* (2013.01); *G06T 1/60* (2013.01); *G06T 15/005* (2013.01); *G06T 15/405* (2013.01); *G06T 15/503* (2013.01); *G06T 15/80* (2013.01); *G06T 17/20* (2013.01); *G09G 5/003* (2013.01); *G09G 5/395* (2013.01); *G06F 2212/302* (2013.01); *Y02D 10/13* (2018.01)

(58) Field of Classification Search
USPC .......................................... 345/557
See application file for complete search history.

(56) References Cited

U.S. PATENT DOCUMENTS

| | | | |
|---|---|---|---|
| 6,697,063 | B1 | 2/2004 | Zhu et al. |
| 6,717,576 | B1 | 4/2004 | Duluk et al. |
| 7,102,646 | B1 | 9/2006 | Rubinstein et al. |
| 7,170,515 | B1 | 1/2007 | Zhu et al. |
| 7,505,036 | B1 * | 3/2009 | Baldwin ............ G06T 15/503 345/419 |
| 8,605,102 | B1 | 12/2013 | Purcell et al. |
| 9,589,310 | B2 * | 3/2017 | Duluk, Jr. ............ G06T 1/20 |
| 2004/0130552 | A1 * | 7/2004 | Duluk, Jr. ............ G06T 15/005 345/506 |
| 2008/0074430 | A1 | 9/2008 | Jiao et al. |
| 2009/0058848 | A1 | 3/2009 | Howson |
| 2010/0169608 | A1 | 7/2010 | Kuo et al. |
| 2011/0090220 | A1 * | 4/2011 | Molnar ............ G06T 15/005 345/420 |

OTHER PUBLICATIONS

Non-Final Office Action having U.S. Appl. No. 14/045,372, dated May 8, 2015.

Non-Final Office Action having U.S. Appl. No. 14/045,367, dated Jun. 19, 2015.

Non-Final Office Action having U.S. Appl. No. 14/045,361, dated Apr. 23, 2015.

Non-Final Office Action for U.S. Appl. No. 14/045,361 dated Feb. 26, 2016.

Non-Final Office Action for U.S. Appl. No. 14/046,249 dated May 10, 2016.

* cited by examiner

STATE HANDLING IN A TILED ARCHITECTURE

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

Field of the Invention

Embodiments of the present invention relate generally to three-dimensional (3D) graphics processing and, more particularly, to state handling in a tiled architecture.

Description of the Related Art

When processing graphics primitives in a graphics subsystem to generate a rendered image, different primitives may be processed with different state applied to those primitives. For example, a primitive may be processed with a state of opaque, meaning that the primitive is not rendered with any transparency. A different primitive may be processed with a state of partially transparent, meaning that the primitive is rendered with some amount of color blending applied. To process different primitives with different states, a graphics subsystem typically receives a number of render commands interleaved with state change commands as well as the primitives being rendered. Each state change command changes the state for primitives that arrive after the state change command.

Some graphics subsystems implement a tiling architecture in which a render target is divided into partitions referred to as tiles. In such an architecture, the primitives received from a graphics application are reordered for rendering based on the tiles that the primitives overlap. This technique generally can increase processing performance. For further improved performance, multiple processing entities may be provided to process the different tiles in parallel.

One challenging aspect of processing data in a tiling architecture is managing state changes. In particular, the reordering of primitives in a tiling architecture complicates the tasks of tracking state changes and applying those state changes in the correct order to the primitives being rendered. Consequently, when primitives are reordered in a tiling architecture, specific steps need to be taken to ensure that state changes are applied to the primitives being rendered in accordance with application-programming-interface (API) order. Such state change management issues are exacerbated in tiling architectures that are highly parallel.

As the foregoing illustrates, what is needed in the art is an effective way to manage and apply state changes when primitives are processed in a highly parallel tiled architecture.

SUMMARY OF THE INVENTION

One embodiment of the present invention sets forth a graphics subsystem. The graphics subsystem includes a first tiling unit, a crossbar unit, and a first screen-space pipeline. The crossbar unit is configured to transmit a first set of primitives interleaved with a first set of state change commands to the first tiling unit. The first tiling unit is configured to record a first initial state associated with the first set of primitives. The first tiling unit is also configured to transmit to the first screen-space pipeline one or more primitives in the first set of primitives that overlap a first cache tile. The first tiling unit is further configured to transmit the first initial state to the first screen-space pipeline. The first tiling unit is further configured to transmit to the first screen-space pipeline one or more primitives in the first set of primitives that overlap a second cache tile.

One embodiment of the present invention sets forth a computing device. The computing device includes a graphics subsystem. The graphics subsystem includes a first tiling unit, a crossbar unit, and a first screen-space pipeline. The crossbar unit is configured to transmit a first set of primitives interleaved with a first set of state change commands to the first tiling unit. The first tiling unit is configured to record a first initial state associated with the first set of primitives. The first tiling unit is also configured to transmit to the first screen-space pipeline one or more primitives in the first set of primitives that overlap a first cache tile. The first tiling unit is further configured to transmit the first initial state to the first screen-space pipeline. The first tiling unit is further configured to transmit to the first screen-space pipeline one or more primitives in the first set of primitives that overlap a second cache tile.

One embodiment of the present invention sets forth a method. The method includes receiving a first set of primitives interleaved with a first set of state change commands. The method also includes recording a first initial state associated with the first set of primitives. The method further includes outputting one or more primitives in the first set of primitives that overlap a first cache tile. The method further includes outputting the first initial state. The method also includes outputting one or more primitives in the first set of primitives that overlap a second cache tile.

One advantage of the disclosed technique is that state changes are restored to an initial value for each cache tile, which allows state changes to be properly processed in a cache tiling architecture. An additional advantage is that only the state that has been changed while processing a cache tile is restored. A further advantage is that state changes that have no effect for a particular cache tile are filtered out, thus reducing the workload encountered by the screen-space pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
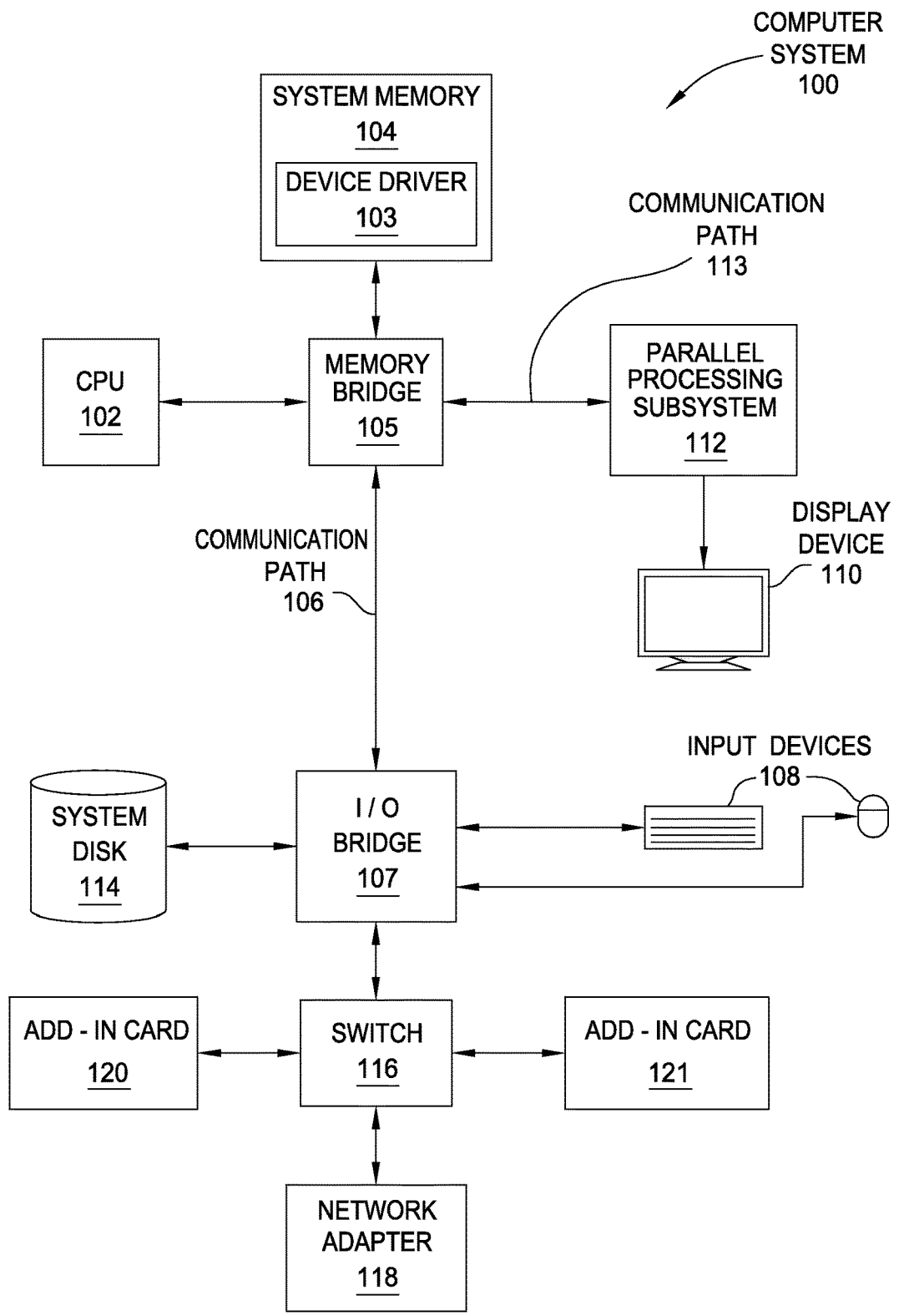
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
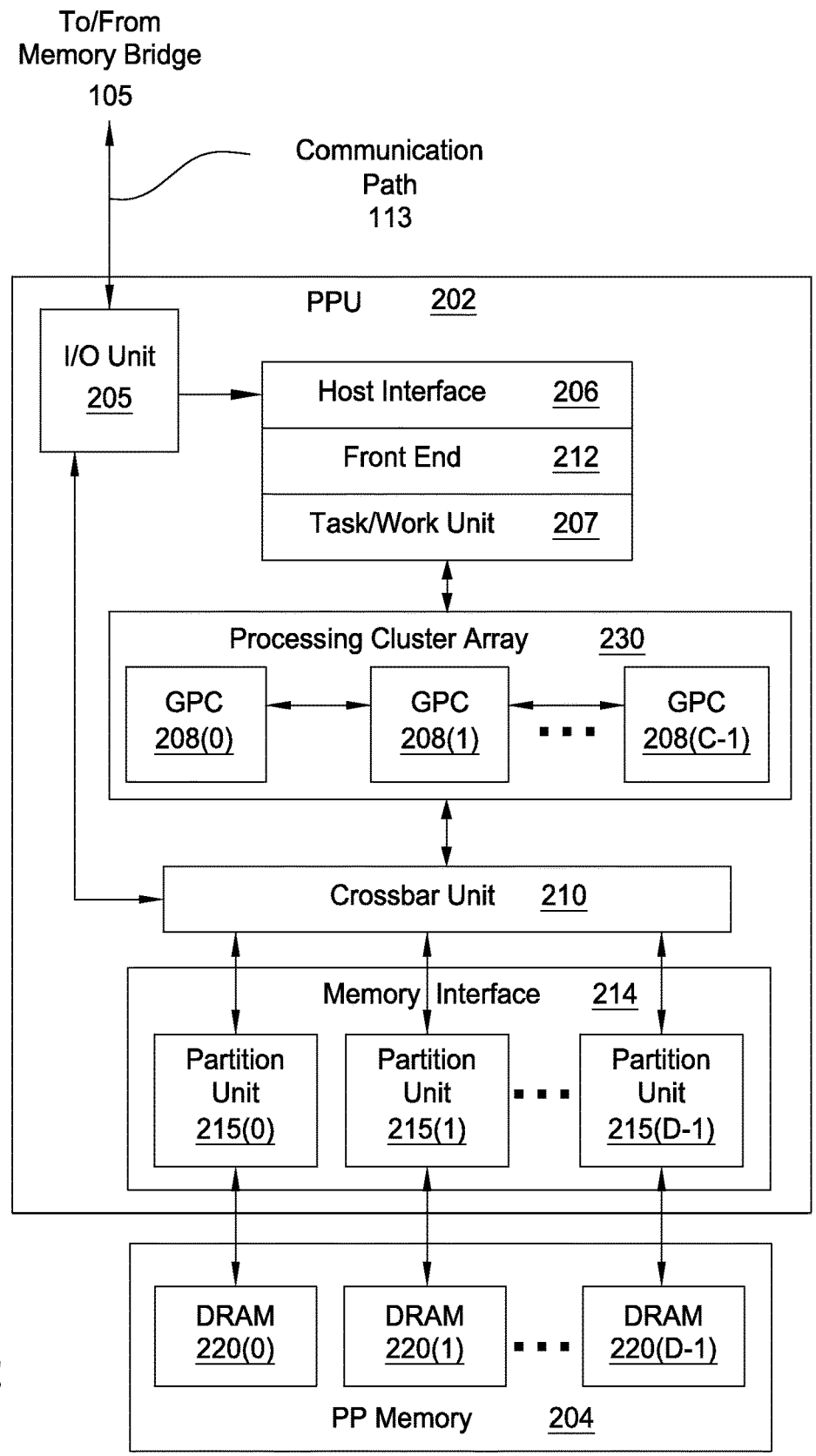
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
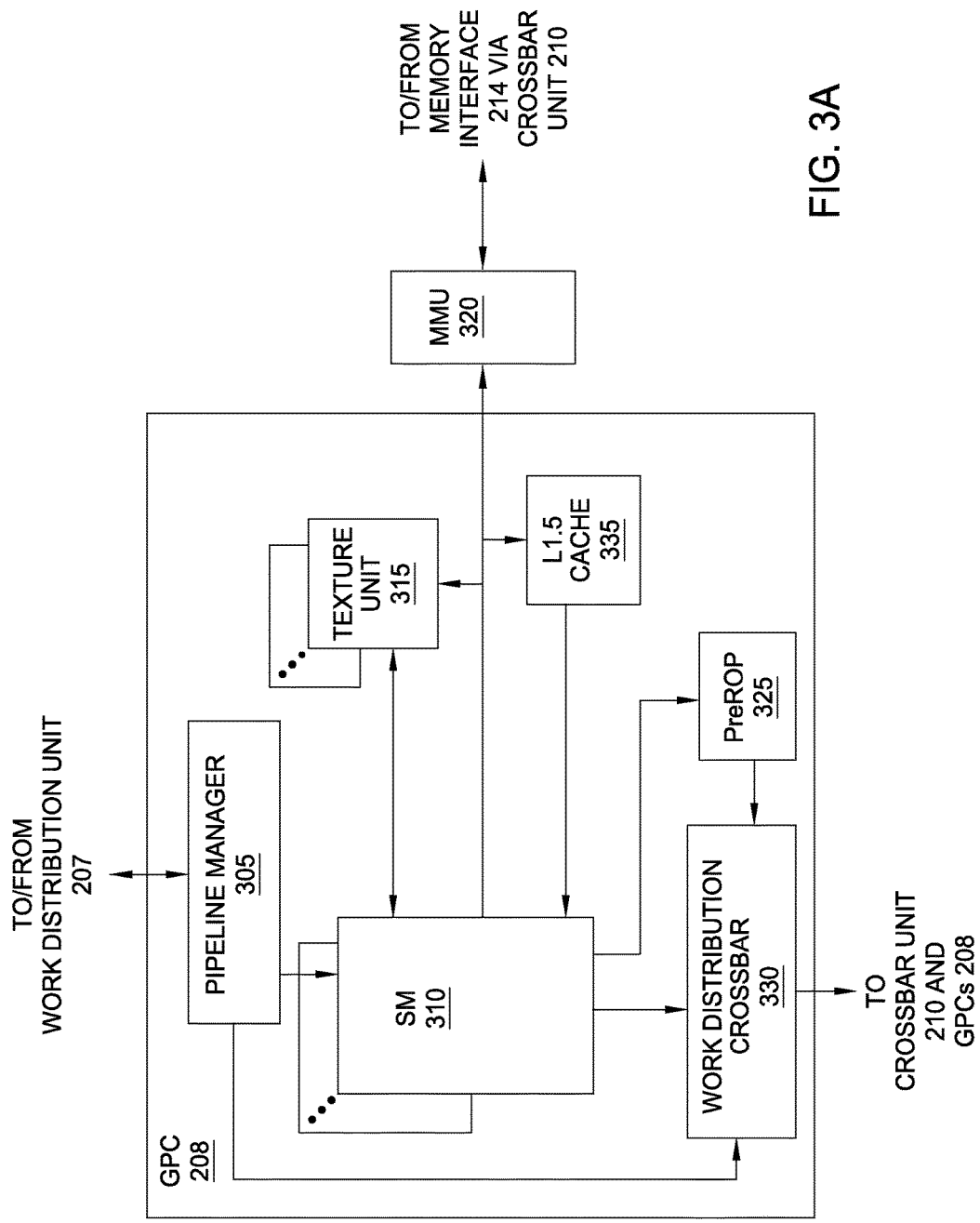
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
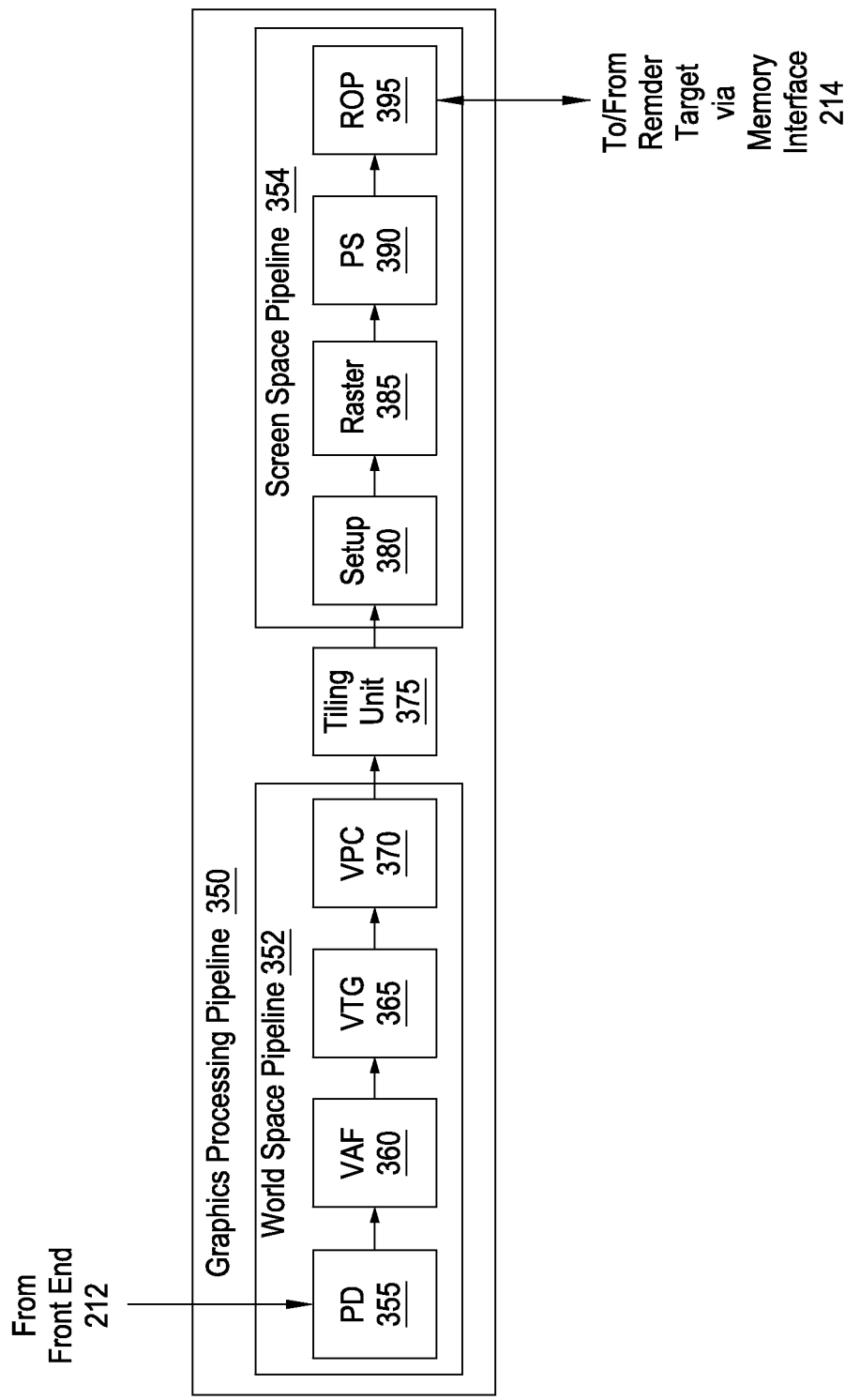
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
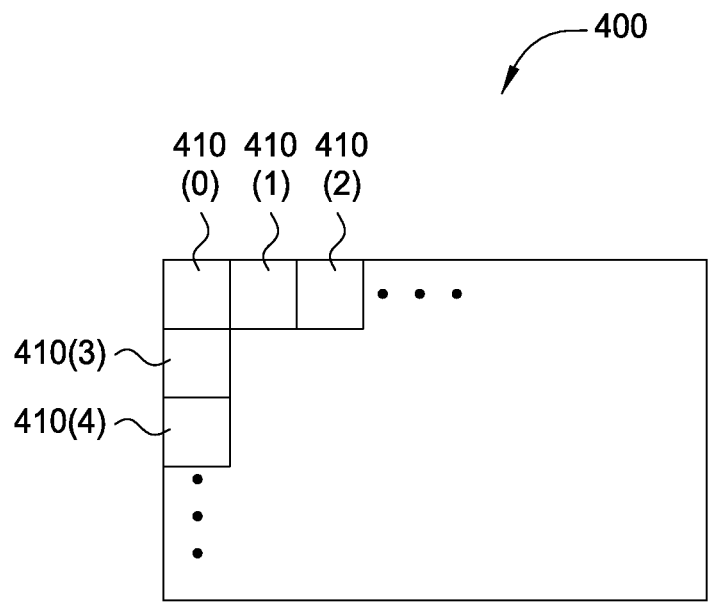
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

State Handling in a Tiled Architecture

In a cache tiling architecture, such as the architecture described above with respect to FIGS. 3B and 4, primitives provided to the graphics subsystem are reordered based on the cache tile 410 that the primitives overlap. This technique allows primitives in the same screen-space area to be processed together, which reduces memory traffic.

The manner in which primitives are processed by the graphics subsystem is affected by certain data referred to as "state." For example, a primitive may be processed with a state of opaque, meaning that the primitive is not rendered with any transparency. A different primitive may be processed with a state of partially transparent, meaning that the primitive is rendered with some amount of color filtering applied. State may be altered during processing of the primitives, by commands referred to as "state bundles." State bundles are sent by device driver 103 and flow through the units of the graphics pipeline. The state bundles cause units to alter certain stored data that tracks state such that primitives received after the state bundles are rendered in accordance with this new state. Because of the unique manner in which the cache tiling architecture rearranges and processes primitives, special techniques are disclosed herein for handling state changes in the context of the cache tiling architecture. FIGS. 5A-7 illustrate various aspects related to these special techniques.

Figure 5A:
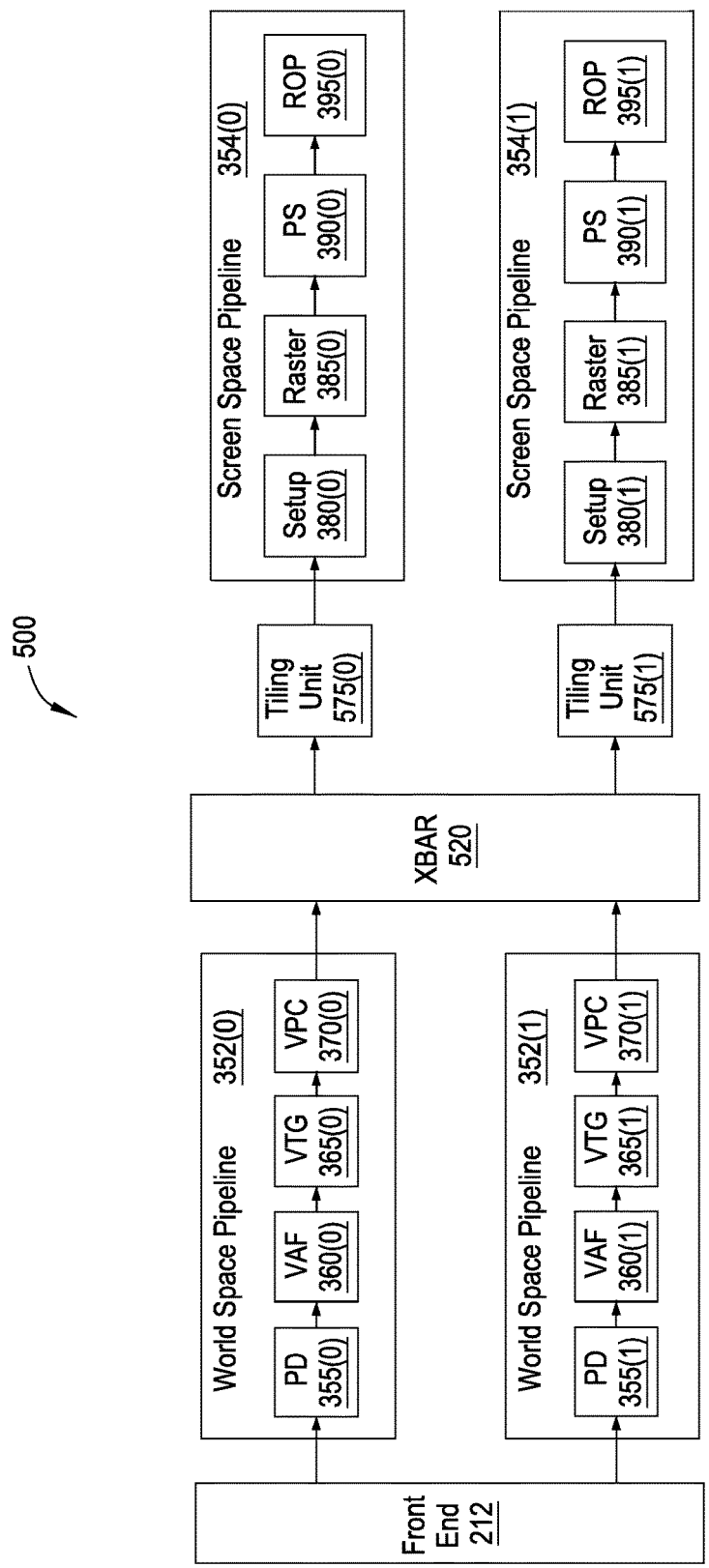
FIG. 5A illustrates a graphics subsystem configured to implement state handling functionality, according to one embodiment of the present invention.

FIG. 5A illustrates a graphics subsystem configured to implement state handling functionality, according to one embodiment of the present invention. As shown, the graphics subsystem 500 includes a front end unit 212, a first world-space pipeline 352(0), a second world-space pipeline 352(1), a crossbar unit 520 ("XBAR"), a first tiling unit 575(0), a second tiling unit 575(1), a first screen-space pipeline 354(0), and a second screen-space pipeline 354(1).

The graphics subsystem 500 includes at least two instances of the screen-space pipeline 354 and the world-space pipeline 352, for increased performance. The graphics subsystem 500 also includes a crossbar unit 520 for transmitting work output from the first world-space pipeline 352(0) and the second world-space pipeline 352(1) to the first tiling unit 575(0) and the second tiling unit 575(1). Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5A functions in a similar manner as described above with respect to FIGS. 1-4.

Figure 5B:
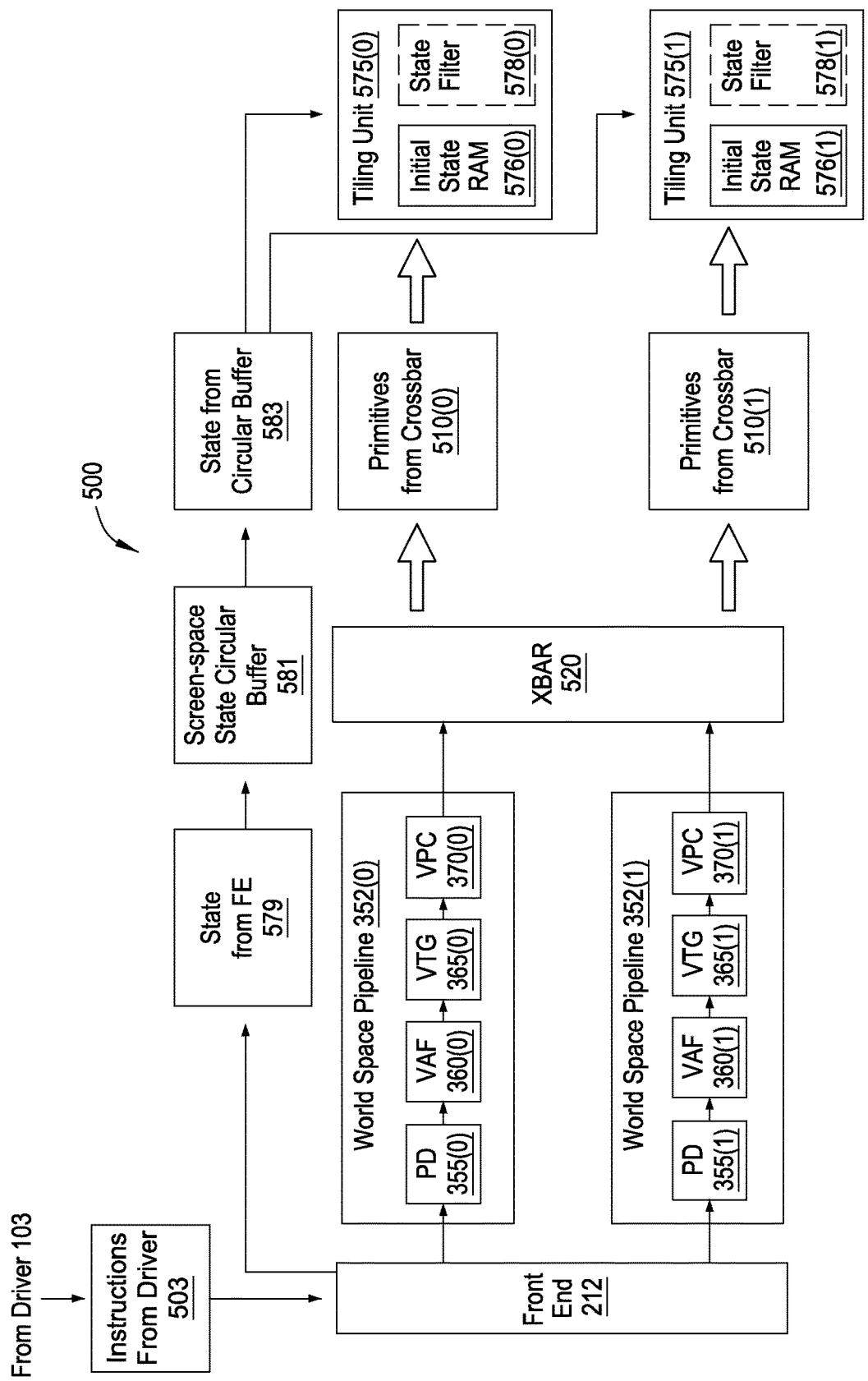
FIG. 5B is a block diagram of a world-space portion of the graphics subsystem of FIG. 5A, according to one embodiment of the present invention.
Figure 5C:
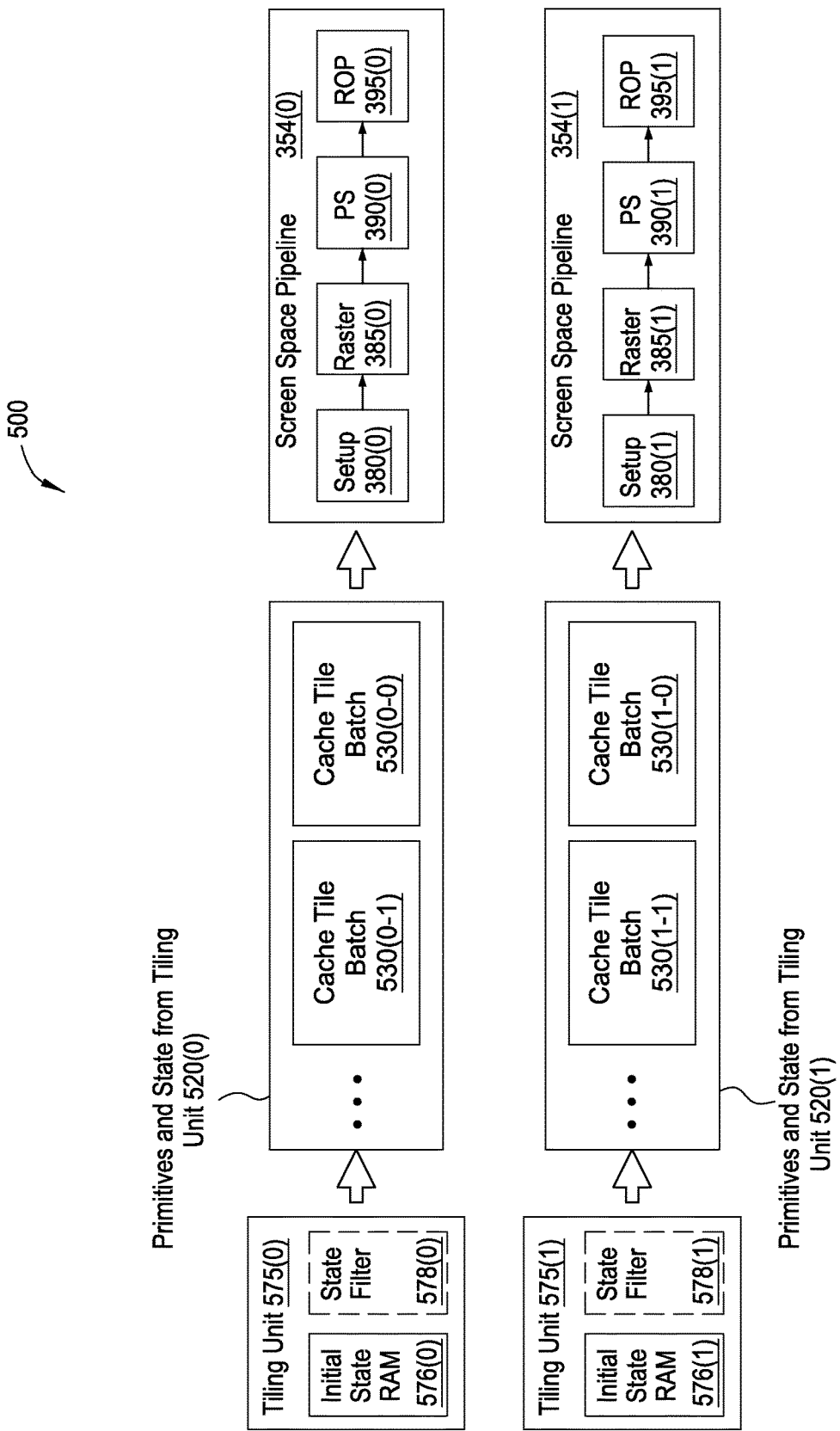
FIG. 5C is a block diagram of a screen-space portion of the graphics subsystem of FIG. 5A, according to one embodiment of the present invention.

Operation of the graphics subsystem 500 is now described in more detail with respect to FIGS. 5B and 5C. FIG. 5B illustrates a world-space side of the graphics subsystem 500 that receives instructions 503 transmitted by a device driver 103 and processes those commands 503 to generate primitives. FIG. 5C illustrates the screen-space side of the graphics subsystem 500, which processes the primitives and the invalidate command to generate and then invalidate pixel data.

FIG. 5B is a block diagram of a world-space portion of the graphics subsystem 500 of FIG. 5A, according to one embodiment of the present invention. As shown, the world-space portion of the graphics subsystem 500 includes a front-end unit 212, a first world-space pipeline 352(0), a second world-space pipeline 352(1), a crossbar unit 520, a first tiling unit 575(0), and a second tiling unit 575(1).

A device driver 103 transmits instructions 503 to the front end unit 212. The instructions 503 include primitives and state change commands arranged in application-programming-interface order (API order). API order is the order in which the device driver 103 specifies that the commands should be executed and is typically specified by an application executing on CPU 102. For example, an application may specify that a first primitive is to be drawn, and then that a first state is to be changed from one value to another value, and then that a second primitive is to be drawn.

State includes information regarding the manner in which primitives are drawn and typically affects the appearance of primitives. State is transmitted through the graphics subsystem 500 as state bundles, which flow through the units of the pipeline. Driver 103 transmits state bundles to front end unit 212, which causes the state bundles to flow down the pipeline. Each unit that receives a state bundle processes later-received work in accordance with the state bundle. Many different types of state exist, and a state bundle can alter the value of such different types of state. Several examples of types of state include alpha blending values, lighting, transparency, and the like. The type of a state is referred to herein as a state identifier or state ID, and the value of the state is referred to herein as the state value. A state bundle may alter the state value associated with a particular state ID, while leaving the value for other state IDs unchanged.

When the front end unit 212 receives the instructions 503 from the device driver 103, the front end unit 212 distributes tasks associated with the instructions 503 to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the instructions 503 to the first world-space pipeline 352(0) and tasks for a second batch of primitives associated with the instructions 503 to the second world-space pipeline 352(1). In some embodiments, the front end unit 212 also transmits state information 579 to a screen-space circular buffer 581, which is a buffer that stores certain information that is to be transmitted to the screen-space pipelines 354. The screen-space circular buffer 581 may be stored in a cache memory such as an L2 cache (not shown). In other embodiments, the front end unit 212 transmits state bundles to the world-space pipeline 352.

The first world-space pipeline 352(0) and second world-space pipeline 352(1) each process tasks associated with the instructions 503, and generate primitives for processing by the first screen-space pipeline 354(0) and the second screen-space pipeline 354(1). The first world-space pipeline 352(0) and second world-space pipeline 352(1) each include a bounding box generator unit (not shown) that determines to which screen space pipeline—the first screen-space pipeline 354(0) or the second screen-space pipeline 354(1)—each primitive should be transmitted. To make this determination, the bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. A primitive may be transmitted to multiple screen-space pipelines 354 if the primitive overlaps raster tiles 420 associated with more than one screen-space pipeline 354. After the world-space pipelines 352 generate the primitives, the world-space pipelines 352 transmit the primitives to the crossbar unit 520, which transmits the primitives to the corresponding tiling units 375 as specified by the bounding box generator unit. In embodiments in which the front end unit 212 transmits the state 579 to the screen-space circular buffer, the tiling unit 575 fetches appropriate state information from the circular buffer 583 at an appropriate time. More specifically, the tiling unit 575 fetches state information 583 in application-programming-interface-order (API-order). Fetching state information 583 in API-order means that the tiling unit 575 fetches the state information 583 such that the primitives received from the crossbar 510 and the state information 583 fetched from the circular buffer 583 is in the order specified by the driver 103. In embodiments in which the front end unit 212 transmits the state 579 to the world-space pipelines 352, the world-space pipelines 352 transmit the state bundles to the crossbar unit 520 for transmission to the tiling units 575. Each state bundle is transmitted to every tiling unit 575.

FIG. 5B depicts two groups of primitives 510 transmitted by the crossbar unit 520 to the tiling units 575. Primitives 510(0) include primitives that overlap raster tiles 420 associated with the first screen-space pipeline 354(0). Similarly, primitives and state 510(1) include primitives that overlap raster tiles 420 associated with the second screen-space pipeline 354(1). The first tiling unit 575(0) receives the primitives 510(0) and the second tiling unit 575(1) receives the primitives 510(1). The tiling units 575 receive state bundles from the screen-space circular buffer 581, in API order (that is, interwoven with the primitives in the order specified by the device driver 103). The first tiling unit 575(0) and second tiling unit 575(1) process the primitives and state bundles as described with respect to FIG. 5C.

FIG. 5C is a block diagram of a screen-space portion of graphics subsystem 500 of FIG. 5A, according to one embodiment of the present invention. As shown, the screen-space side of the graphics subsystem 500 includes a first tiling unit 575(0), a second tiling unit 575(1), a first screen-space pipeline 354(0), and a second screen-space pipeline 354(1).

As described above with respect to FIG. 5B, the tiling units 575 receive primitives and state bundles. Each tiling unit 575 accepts and stores these primitives and state bundles until the tiling unit 575 decides to perform a flush operation. Each tiling unit 575 decides to perform a flush operation when one or more resource counters maintained by the tiling units 575 indicates that a resource has exceeded a threshold.

Upon receiving primitives and state bundles, a tiling unit 575 updates several resource counters associated with the primitives and state bundles. The resource counters are configured to track the degree of utilization of various resources associated with the primitives and state bundles received by the tiling units 575. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 575. Each tiling unit 575 includes a primitive storage space that is maintained independently of primitive storage space for other tiling units 575. When a tiling unit 575 receives a primitive, some of the primitive storage space is occupied by the primitive. Because only a limited amount of primitive storage space exists for each tiling unit 575, exceeding a threshold amount of storage space in a particular tiling unit 575 causes the tiling unit 575 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 575 maintains a count of the amount of space occupied by circular buffer entries associated with primitives in the tiling unit 575.

In one embodiment, the vertex attribute circular buffer may be structured as a collection of smaller per-world-space-pipeline circular buffers. Each per-world-space-pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 575 performs a flush operation, the tiling unit 575 iterates through all of the cache tiles 410, and for each cache tile 410, generates a cache tile batch that includes primitives that overlap the cache tile 410, as well as all state bundles stored in the tiling unit 575 (subject to filtering operations described below, for example with respect to FIG. 5E), and transmits the cache tile batches to the associated screen-space pipeline 354. For example, tiling unit 575(0) generates cache tile batch 530(0-0) and cache tile batch 530(0-1), as well as additional cache tile batches not shown. Tiling unit 575(1) generates cache tile batch 530(1-0) and cache tile batch 530(1-1), as well as additional cache tile batches not shown.

Each tiling unit 575 is associated with a different screen-space pipeline 354. Thus, each tiling unit 575 transmits cache tile batches to the associated screen-space pipeline 354. For example, tiling unit 575(0) transmits cache tile batch 530(0-0) and cache tile batch 530(0-1) to screen-space pipeline 354(0). Tiling unit 575(1) transmits cache tile batch 530(1-0) and cache tile batch 530(1-1) to screen-space pipeline 354(1).

The tiling unit 575 transmits these cache tile batches to the screen-space pipeline 354 associated with the tiling unit as the cache tile batches are generated. The tiling unit 575 continues to generate and transmit cache tile batches in this manner for all cache tiles 410 associated with a render target. In one embodiment, the tiling unit 575 determines which primitives overlap a cache tile 410 by comparing a border of the cache tile 410 with bounding boxes associated with the primitives and received from the bounding box unit.

The cache tile batches 530 flow through the screen-space pipelines 354 in the order in which the tiling unit 575 generates the cache tile batches 530. This ordering causes the units in the screen-space pipelines 354 to process the primitives in cache tile order. In other words, the screen-space pipelines 354 process primitives that overlap a first cache tile, and then process primitives that overlap a second cache tile, and so on.

Subject to filtering techniques described below, for example with respect to FIG. 5E, each state bundle is included in each cache tile batch, so that the primitives in each cache tile batch are processed with the correct state. More specifically, state changes are included within each cache tile batch so that the primitives rendered for any particular cache tile batch are rendered with the state specified by the commands transmitted to the device driver 103 (e.g., as directed by the application executing on the CPU 101). However, because of the manner in which primitives are processed in a cache tiling architecture, simply including all state changes in each cache tile batch is generally insufficient to ensure that the primitives are processed with the state as specified by the original commands transmitted from the driver 103.

Conceptually, each cache tile batch can be thought of as beginning at the point in time at which the tiling unit 575 began accepting primitives after the previous flush operation. In other words, even though the cache tile batches are transmitted to and processed by the screen-space pipelines 354 sequentially, each cache tile batch logically begins at the same point in time. Of course, because the cache tiles generally do not overlap in screen space, sequential processing in this manner generally produces the desired results.

Because each cache tile logically begins at the same point in time, the screen-space pipeline 354 must begin at the same state for each cache tile batch. However, the units in the screen-space pipeline 354 do not have built in functionality to cause the state to be reset to this point in time. Instead, the units in the screen-space pipeline 354 simply "see" the different cache tile batches in the order in which the cache tile batches are transmitted by the tiling unit 575. In other words, the screen-space pipeline 354 does not necessarily have special knowledge of the cache tiling operations of the tiling unit 575. Consequently, when a cache tile batch flows through the screen-space pipeline 354, the state changes included in that cache tile batch cause the units in the screen-space pipeline 354 to update state data in accordance with those state changes. When subsequent cache tile batches flow through the screen-space pipeline 354, the state changes for those subsequent cache tile batches cause the units in the screen-space pipeline 354 to update state data that has already been altered by previous cache tile batches. This state behavior can lead to incorrect rendering behavior, since a primitive that "should" be rendered with a certain state applied would instead be rendered with state applied as modified by previous cache tile batches.

To solve this issue, the tiling unit 575 records an initial state in initial state RAM 576 when the tiling unit 575 receives a first primitive after completing a previous flush operation. The tiling unit 575 includes a command to restore the screen-space pipeline 354 to this recorded initial state at the beginning of each cache tile batch except for the first cache tile batch. No initial state needs to be restored with the first cache tile batch because the screen-space pipeline 354 is already in the initial state configuration. The initial state RAM 576 is described in greater detail below with respect to FIG. 5D.

Another issue with handling state bundles in a cache tiling architecture is that the cache tiling techniques has the capability to introduce "holes" in between the various primitives. Typically, an efficiently written application program has few or no "unnecessary" or "redundant" state changes, such as back-to-back state changes on the same state ID, with no intervening primitives to affect. However, even if an application program does include such unnecessary or redundant state changes, the graphics subsystem is configured to filter out such redundant state changes. In one embodiment, front end unit 212 detects state changes on the same state ID between which there are no primitives and filters out the first such state change, since that state change would have no effect on how an image is rendered.

Although the front end unit 212 is able to filter out such state changes, the effects of cache tiling may create conditions in which certain state changes are unnecessary or redundant in the screen-space pipelines 354. State changes may be made redundant or unnecessary because when the primitives are reordered by cache tile, some cache tiles may not include all primitives. Thus, a cache tile batch may not include primitives between two state changes even though primitives would be included between those two state changes in the sequence of primitives and state bundles received by the tiling unit 575. For example, if a state change exists between two primitives that are back-to-back in original ordering, and the second of the two primitives does not overlap a cache tile while the first one does, then only the first primitive and the state change would be included for that cache tile. If a subsequent state change were to revert the state back to original or change the value of the state ID to a third value, then the first state change would have no effect on any primitives for the cache tile. Thus, that first state change is unnecessary for that particular cache tile batch.

Therefore, in some embodiments, the tiling unit 575 includes a state filter block 578 for filtering out state changes that have no effect on primitives included in a particular cache tile batch. Generally speaking, state filter 578 removes state changes that change the value of a state for which no primitives for a particular cache tile 410 are drawn. In one example, for a particular cache tile, state filter 578 filters out the first state change of two consecutive (i.e., with no intervening primitive) state changes on the same state ID. Since no primitives exist for the cache tile between the first and second state changes, the first state change has no effect and can be eliminated. State filter block 578 is described in more detail below with respect to FIG. 5E.

Figures 5D, 5E:
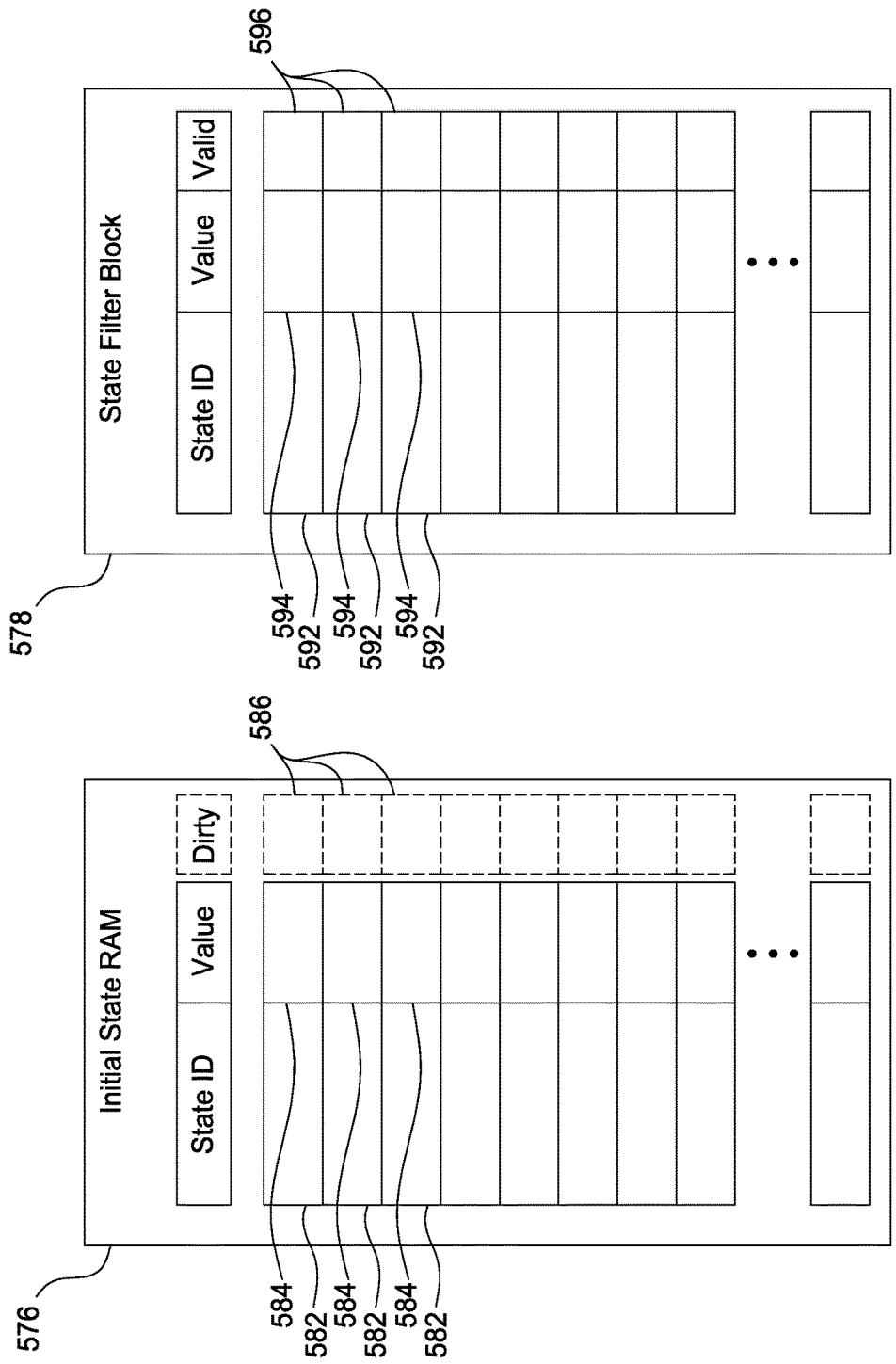
FIG. 5D is a conceptual illustration of an initial state random access memory (RAM) included in the graphics subsystem of FIG. 5A, according to one embodiment of the present invention.
FIG. 5E is a conceptual illustration of a state filter block included in the graphics subsystem of FIG. 5A, according to one embodiment of the present invention.

FIG. 5D is a conceptual illustration of an initial state random access memory (RAM) 576 included in the graphics subsystem of FIG. 5A, according to one embodiment of the present invention. As shown, the initial state RAM 576 includes state identifiers (ID) 582, values 584 corresponding to the state IDs 582, and dirty bits 586 corresponding to the state IDs 582. In some embodiments, the state identifiers are not explicitly stored in the initial state RAM 576, but are instead inferred based on the location of the entry in the initial state RAM 576. In other words, each slot in the initial state RAM 576 is mapped to a particular state ID.

The initial state RAM 576 includes a plurality of entries, each associated with a different state ID. For example, one entry might be associated with a transparency state, another entry might be associated with state for a particular shading mode, and so on. The initial state RAM 576 also includes a value 584 for each of the state IDs. The value 584 records the value of the state identified by the state ID 582. For example, if one state ID 582 indicates the opacity state, then the value 584 may indicate 100% opacity, 50% opacity, 0% opacity, or other values.

The initial state RAM 576 indicates the state that exists when the tiling unit 575 begins to perform a flush operation. In other words, the initial state RAM 576 indicates state at the beginning of the generation and transmission of cache tile batches to the screen-space pipelines 354. The purpose of the initial state RAM 576 is to "reset" the state at the beginning of each cache tile batch. Each cache tile batch is associated with a particular cache tile 410 and includes primitives associated with that cache tile 410. The cache tile batch also includes state changes received from the driver 103 and included in instructions 503. The state changes cause units in the screen-space pipeline 354 to perform their corresponding operations based on the state identified by the state changes. Thus these state changes change the state of the units in the screen-space pipeline 354.

Because the tiling unit 575 reorganizes the primitives by cache tile 410, each cache tile batch needs to operate on a sequence of state changes that includes the state that exists at the beginning of performing the flush operation. However, because an earlier cache tile batch may cause the state to be changed, the state changes included with a subsequent cache tile batch would act relative to the state changes of the earlier cache tile batch, rather than relative to the state that existed at the beginning of the flush operation. To remedy this, the initial state RAM 576 records and transmits the initial state to the screen-space pipeline 354 at the beginning of each cache tile batch except for the first cache tile batch after a flush operation. This causes the state changes included with each cache tile batch to operate relative to the state that exists at the time that the tiling unit 575 performs a flush operation, rather than relative to state as changed by previous cache tile batches.

In some embodiments, the initial state RAM 576 includes dirty bits 586 as an optimization. The dirty bits allow the tiling unit 575 to transmit only the values in the initial state that have been changed by previous cache tile batches, rather than the entire snapshot of the state that existed at the time the flush operation is performed. The dirty bits thus reduce the amount of state information that is transmitted down the pipeline.

The dirty bits 586 operate as follows. When the tiling unit 575 receives a first primitive after a flush operation, the tiling unit 575 records a snapshot of the state of the screen-space pipeline 354. The tiling unit 575 receives primitives and state and generates cache tile batches as described above. In other words, the tiling unit 575 iterates through each cache tile, and for each cache tile, determines which primitives overlap the cache tile, and transmits those primitives downstream. As the tiling unit 575 is determining which primitives to transmit, the tiling unit 575 also includes state changes with those primitives, in the order in which the state changes are received by the tiling unit 575. When the tiling unit 575 includes a state change with the primitives in a particular cache tile batch, the tiling unit 575 sets a dirty bit 586 that corresponds to the state ID of the state change to "1." This value of "1" indicates that the value associated with that particular state ID has changed since the beginning of the cache tile batch, and therefore that the value must be reset when the next cache tile begins. When the tiling unit 575 begins the next cache tile batch, the tiling unit 575 transmits only the state for which the dirty by has been set to "1," instead of all of the state. The tiling unit 575 then resets all dirty bits back to "0." By tracking which state IDs need to be reset in this manner, the amount of state that needs to be transmitted down the screen-space pipeline 354 in this manner is reduced, since the tiling unit 575 does not need to transmit all of the state downstream.

FIG. 5E is a conceptual illustration of a state filter block 578 included in the graphics subsystem 500 of FIG. 5A, according to one embodiment of the present invention. As shown, the state filter block 578 includes state identifiers (IDs) 592, state values 594, and valid bits 596.

The state filter block 578 operates on data that the tiling unit 575 has already determined as being included in a particular cache tile batch. In other words, the state filter block 578 filters out state changes from the stream of primitives and state change commands generated by the tiling unit 575 that constitutes a cache tile batch. The state filter block 578 operates on primitives and state changes after the tiling unit 575 has determined that the primitives and state changes belong in a particular cache tile batch, but prior to being transmitted from the tiling unit 575 to the screen-space pipeline 354.

When a state change arrives at the state filter block 578, the state filter block 578 updates an entry in the state filter block 578. More specifically, the state filter block 578 includes a state ID entry that indicates the state ID 592 of the state change and a value 594 corresponding to the state ID, that indicates the value specified by the received state change. The state filter block 578 also sets a valid bit 596 corresponding to the state ID to "1."

When the state filter block 578 detects a primitive, the state filter block 578 transmits a state bundle to the screen-space pipeline 354 that includes state changes for all of the state IDs for which the valid bit 596 has been set to "1." The state filter block 578 then resets all valid bits 596 back to "0." The tiling unit 575 then transmits the primitive to the screen-space pipeline. When the state filter block 578 detects the next primitive, the state filter block begins updating entries in the state filter block 578 again, as described above.

The state filter block 578 thus coalesces state changes so that a single coalesced state change is transmitted to a corresponding screen-space pipeline 354 when multiple state changes exist for a single cache tile with no intervening primitives. This coalescing reduces the amount of state that is transmitted down the pipeline, which reduces the amount of bandwidth consumed by state changes.

The state filter block 578 does not transmit any state changes if there are no primitives after a state change at the end of a cache tile batch. This is because the initial state from initial state RAM 576 restores the state to the initial state at the beginning of the next cache tile batch, and therefore, state changes at the end of a cache tile batch would have no effect on any primitives. One exception to this rule is that when the state is at the end of the last cache tile batch that the tiling unit 575 generates at the end of a flush operation, then the tiling unit 575 transmits any state changes to the screen-space pipeline 354. This is because such state changes may have an effect on primitives in cache tile batches generated in a subsequent flush operation.

Additionally, if the first thing that the tiling unit 575 encounters after beginning a flush operation is a state change, then the tiling unit 575 does not include such a state change in each of the cache tile batches (i.e., the tiling unit 575 does not "tile" such a state change) and only transmits the state change to the screen-space pipeline 354 once. The state change, transmitted once, affects all subsequently transmitted primitives, which would be the case if the state change was included in each cache tile batch. Transmitting such a state change only once reduces the amount of bandwidth consumed by state changes.

The initial state RAM 576 has no direct effect on the state filter block 578, except that the initial state RAM 576 "resets" the state for each cache tile, and this "reset" state may be accumulated in the state filter as described above. More specifically, the state changes specified by the initial state RAM 576 may be filtered out as specified above.

Figure 6A:
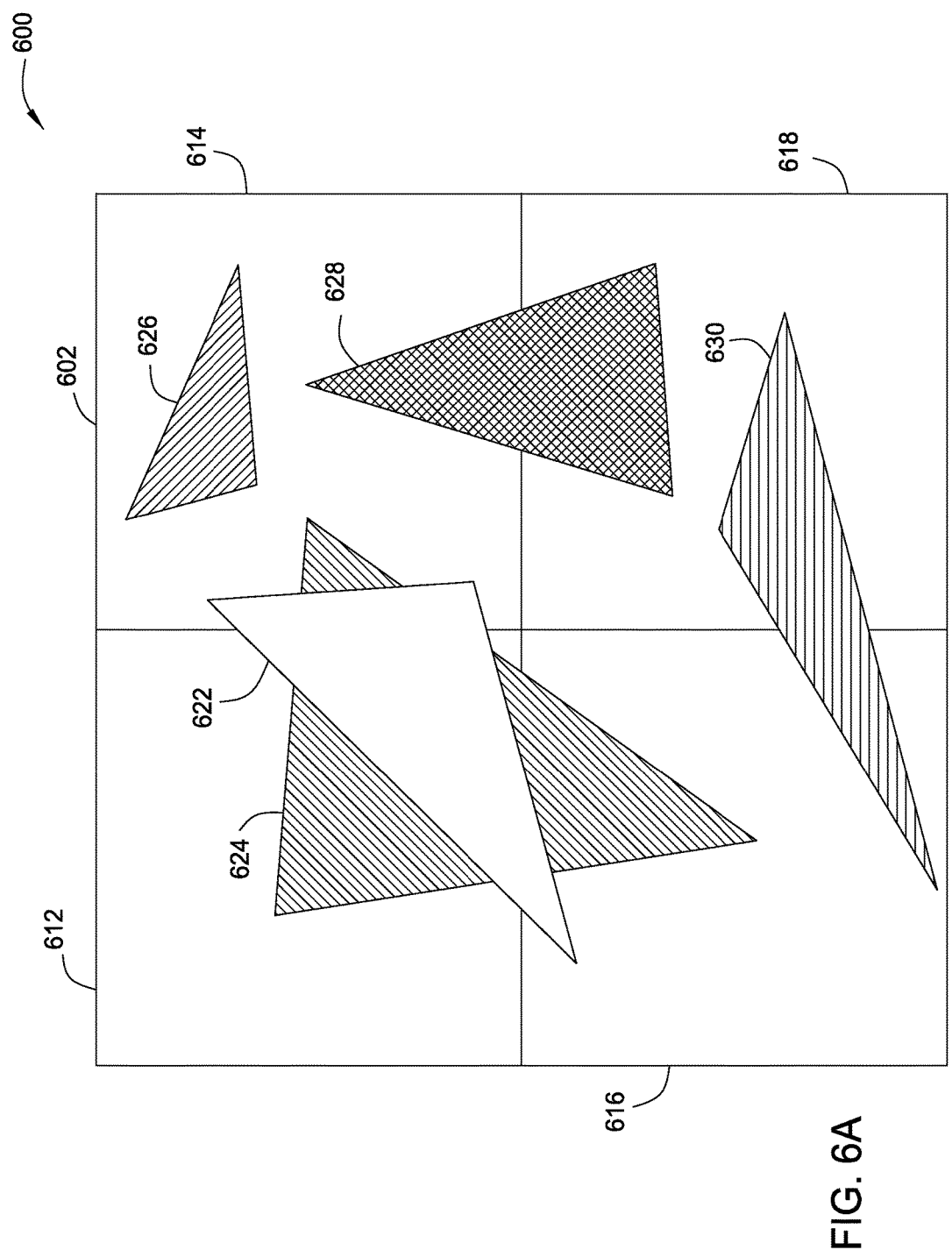
FIG. 6A is a conceptual illustration of various primitives rendered to a render target, according to one embodiment of the present invention.

FIG. 6A is a conceptual illustration 600 of various primitives rendered to a render target 602, according to one embodiment of the present invention. As shown, the render target 602 includes a first cache tile 612, a second cache tile 614, a third cache tile 616, and a fourth cache tile 618.

Five primitives are shown within render target 602. The different cross-hatchings depicted for each of the primitives represent different state with which the primitives are drawn. First primitive 622, drawn without a cross-hatching, overlaps first cache tile 612, second cache tile 614, and third cache tile 616. Second primitive 624, drawn with down-and-leftward slanting cross-hatching, overlaps first cache tile 612, second cache tile 614, and third cache tile 616. Third primitive 626, drawn with down-and-rightward cross-hatching, overlaps second cache tile 614. Fourth primitive 628, drawn with diamond cross-hatching, overlaps second cache tile 614 and fourth cache tile 618. Finally, fifth primitive 630, drawn with horizontal cross-hatching, overlaps third cache tile 616 and fourth cache tile 618.

Figure 6B:
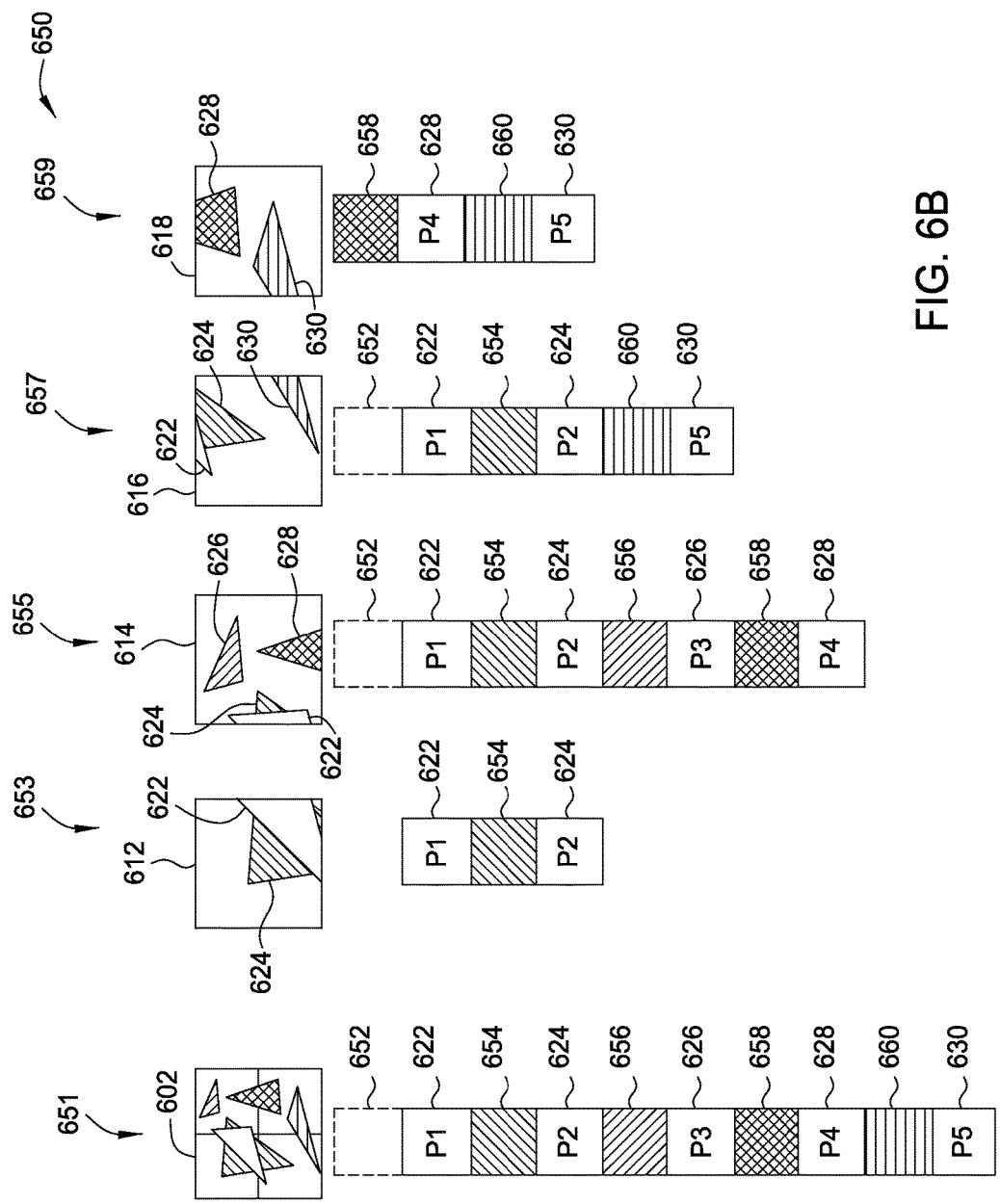
FIG. 6B is a conceptual illustration of state change filtering operations performed by a tiling unit when the primitives of FIG. 6A are rendered to a render target, according to one embodiment of the present invention.

FIG. 6B is a conceptual illustration 650 of state change filtering operations performed by a tiling unit 575 when the primitives of FIG. 6A are rendered to a render target, according to one embodiment of the present invention. As shown, FIG. 6B illustrates the overall sequence 651 of primitives and state change commands, as well as a first sequence 653 for first cache tile 612, a second sequence 655 for second cache tile 614, a third sequence 657 for third cache tile 616, and a fourth sequence 659 for fourth cache tile 618.

The overall sequence 651, which includes a miniature depiction of the render target 602 shown in FIG. 6A for clarity, depicts several primitives and state change commands, as well as the initial state 652 for clarity. Further, for convenience of explanation, all of the state changes depicted in FIG. 6B operate on the same state ID. Persons of skill in the art would understand, however, that different state changes may instead operate on any combination of state IDs. Additionally, the overall sequence 651 does not represent any sequence actually generated by the tiling unit 575, or as processed by the screen-space pipeline 354, but instead represents the sequence of commands received by the tiling unit 575. In other words, sequence 651 represents the sequence of commands that would be processed by the screen-space pipeline 354 if no tiling unit existed 575.

The initial state 652 represents the state of the screen-space pipeline 354 at the time that the first primitive 622 is transmitted to the tiling unit 575. As can be seen in the overall sequence 651, the first primitive 622 is the first primitive to be drawn. After the first primitive 622 is drawn, the first state change 654 is applied. Subsequently, second primitive 624 is drawn. Next, the second state change 656 is applied. The third primitive 626 is then rendered. Next, the third state change 658 is applied. The fourth primitive 628 is then rendered accordingly. Finally, the fourth state change 660 is applied and the fifth primitive 630 is rendered.

In operation, the tiling unit 575 receives the commands in sequence 651 and generates first sequence 653, corresponding to first cache tile 612, second sequence 655, corresponding to second cache tile 614, third sequence 657, corresponding to third cache tile 616, and fourth sequence 659, corresponding to fourth cache tile 618. Not all primitives from the overall sequence 651 are included in each of the cache tile batches associated with first cache tile 612, second cache tile 614, third cache tile 616, and fourth cache tile 618. In first sequence 653, associated with first cache tile 612, only the first primitive 622 and the second primitive 624 overlap the first cache tile 612. Therefore, only first primitive 622 and second primitive 624 are included in first sequence 653. Because first cache tile 612 is the earliest cache tile transmitted by the tiling unit 575 after a flush operation, the initial state 652 is also not included in the first sequence 653. Because second state change 656 is followed by third state change 658, second state change is filtered out by state filter block 578 and is not included in first sequence 653. For similar reasons, third state change 658 is not included. Finally, because there are no primitives after fourth state change 660, fourth state change is not included in first sequence 653.

In second sequence 655, associated with second cache tile 614, only the first primitive 622, second primitive 624, third primitive 626, and fourth primitive 628 are included. The fifth primitive 630 is not included because the fifth primitive 630 does not overlap the second cache tile 614. The initial state 652 is included in the second sequence 655, as are the first state change 654, the second state change 656, and the third state change 658. However, the fourth state change 660 is not included because there are no primitives after the fourth state change 660, since the fifth primitive 630 does not overlap the second cache tile 614.

In third sequence 657, associated with third cache tile 616, only the first primitive 622, the second primitive 624, and the fifth primitive 630 are included. The initial state 652 is included, as are the first state change 654 and the fourth state change 660. However, the second state change 656 and the third state change 658 are filtered out. This is because the second state change 656 is followed by the third state change 658, without any intervening primitives, and because the third state change 658 is followed by the fourth state change 660, without any intervening primitives.

In the fourth sequence 659, associated with fourth cache tile 618, only the fourth primitive 628 and the fifth primitive 630 are included. The initial state 652 is not included due to being filtered out. More specifically, because there are no intervening primitives between the initial state 652 and the first state change 654, the initial state 652 is filtered out. Similarly, the first state change 654 is filtered out because there are no primitives between the first state change 654 and the second state change 656. The second state change 656 is also filtered out in a similar manner, because there are no primitives between the second state change 656 and the third state change 658.

Figure 7:
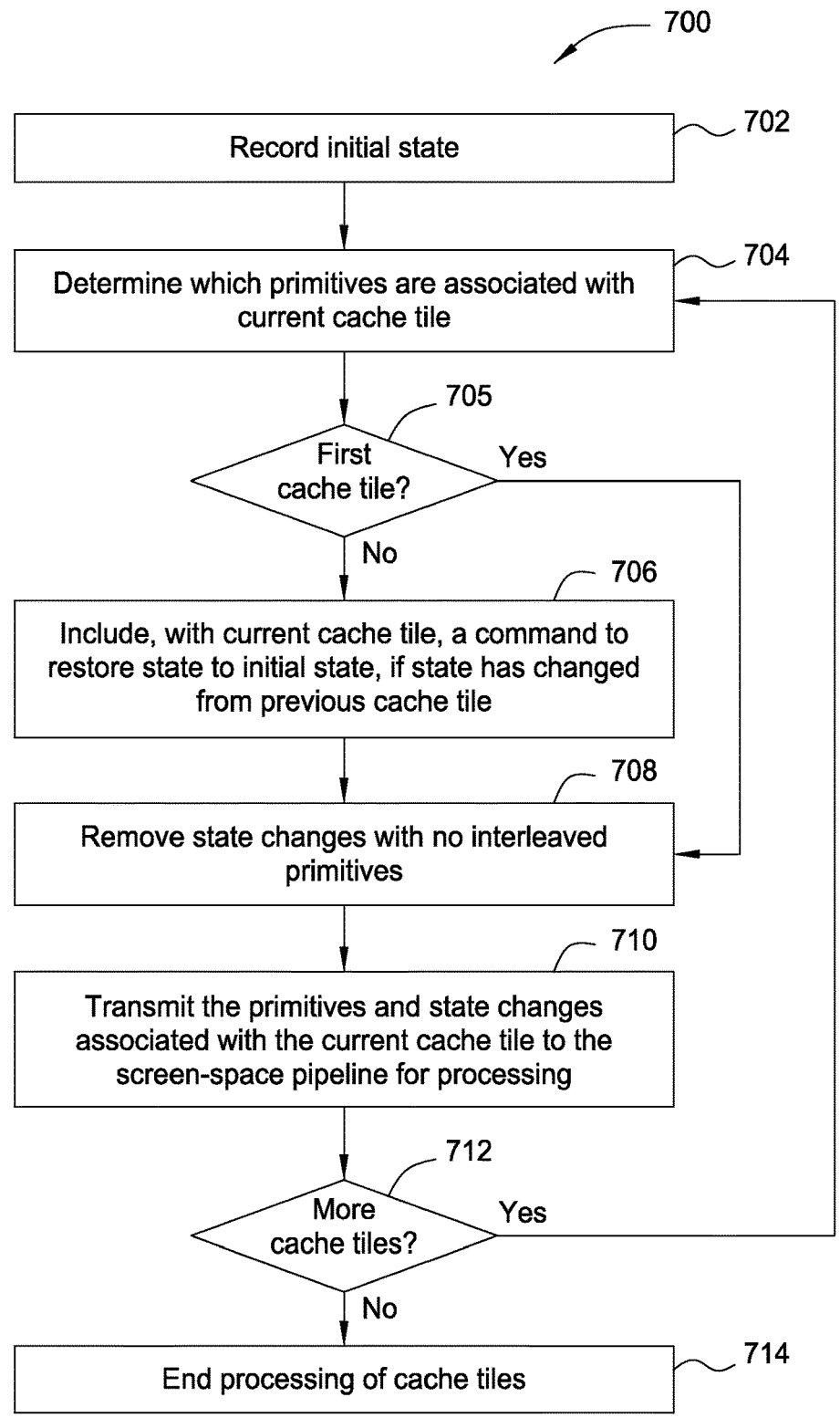
FIG. 7 is a flow diagram of method steps for managing state changes in a tiling architecture, according to one embodiment of the present invention.

FIG. 7 is a flow diagram of method steps for managing state changes in a tiling architecture, according to one embodiment of the present invention. Although the method steps are described in conjunction with FIGS. 1-5E, persons skilled in the art will understand that any system configured to perform the method steps, in any order, falls within the scope of the present invention.

As shown, a method 700 begins at step 702, where the tiling unit 575 records the initial state of the screen-space pipeline 354, in response to receiving a first primitive after finishing performing a prior flush operation. The tiling unit 575 continues to receive primitives and state change commands until the tiling unit 575 decides to perform a flush operation, as described above with respect to FIGS. 5A-5C. When the tiling unit 575 decides to perform a flush operation, the method proceeds to step 704, where the tiling unit 575 determines which primitives in the tiling unit 575 overlap a current cache tile. All state changes are included with each cache tile, subject to the filtering operations described with respect to FIGS. 5D-5E.

In step 705, the tiling unit 575 determines whether the current cache tile is the first cache tile after beginning the flush operation. If the current cache tile is the first cache tile, then the method proceeds to step 708. The method proceeds to step 708 in this case because if the cache tile is the earliest cache tile in a render target, then the initial state does not need to be included, because the screen-space pipeline 354 is already in this initial state. If the current cache tile is not the first cache tile, then the method proceeds to step 706. In step 706, the tiling unit 575 includes, with the current cache tile, a command to restore any state changed by the previous cache tile to the recorded initial state.

In step 708, the tiling unit 575 removes state changes between which there are no interleaved primitives. More specifically, if a first state change and a second state change that operate on the same state ID are to be sent back-to-back, then the first state change is filtered out. This process repeats until there is a state change after which there is a primitive. State filtering is described in more detail with respect to FIG. 5E. In step 710, the tiling unit 575 transmits the primitives and state changes associated with the current cache tile to the screen-space pipeline 354 for processing. In step 712, the tiling unit 575 determines if there are more cache tiles to be processed. If there are more cache tiles, then the method returns to step 704, described above. If there are no more cache tiles, then the method proceeds to step 714, where the tiling unit 575 completes the flush operation. The tiling unit 575 may perform another flush operation at a future time.

In sum, a tiling unit records an initial state for a plurality of primitives in an initial state RAM. The tiling unit receives primitives and state changes from a crossbar unit, organized in API order. The tiling unit then reorders the primitives based on which cache tiles the primitives overlap. For each cache tile, the tiling unit includes all of the state changes received by the tiling unit, as well as primitives that overlap the cache tile. The state changes and primitives are arranged in application-programming-interface order. For each cache tile, the tiling unit also includes the initial state before all of the primitives and state changes. Because not all of the primitives received by tiling unit overlap every cache tile, some state changes may not apply to any primitives that overlap a particular cache tile. The tiling unit filters out such unneeded state changes. The tiling unit filters out a state change if there are no primitives between that state change and the next state change. The tiling unit also filters out a state change if there are no primitives after that state change for a particular tile (i.e., the state change is the last object sent by the tiling unit for a particular cache tile.

One advantage of the disclosed approach is that state changes are restored to an initial value for each cache tile, which allows state changes to be properly processed in a cache tiling architecture. An additional advantage is that only the state that has been changed while processing a cache tile is restored. A further advantage is that state changes that have no effect for a particular cache tile are filtered out, thus reducing the workload encountered by the screen-space pipeline.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A graphics subsystem for managing screen-space state information, comprising:
    a first tiling unit;
    a crossbar unit configured to transmit a first set of primitives interleaved with a first set of state change commands to the first tiling unit; and
    a first screen-space pipeline associated with the first tiling unit,
    wherein the first tiling unit is configured to:
        record a first initial state associated with the first set of primitives,
        transmit to the first screen-space pipeline one or more primitives in the first set of primitives that overlap a first cache tile,
        determine one or more values of the first initial state that changed when processing the first cache tile via the first screen-space pipeline,
        transmit a command to the first screen-space pipeline to restore only the one or more values of the first initial state that changed when processing the first cache tile to the first initial state, and
        transmit to the first screen-space pipeline one or more primitives in the first set of primitives that overlap a second cache tile.

2. The graphics subsystem of claim 1, wherein the first tiling unit is further configured to record the first initial state upon receiving an earliest primitive in the first set of primitives from the crossbar unit.

3. The graphics subsystem of claim 2, wherein the first initial state comprises state information reflective of state associated with the first screen-space pipeline when the first tiling unit receives the earliest primitive.

4. The graphics subsystem of claim 1, wherein a first state change in the first set of state change commands is configured to specify a first state identity and a first state value and a second state change in the first set of state change commands is configured to specify a second state identity and a second state value.

5. The graphics subsystem of claim 4, wherein the first tiling unit is further configured to transmit the first state change and the second state change to the screen-space pipeline with the one or more primitives that overlap the first cache tile.

6. The graphics subsystem of claim 5, wherein the first tiling unit includes a state filter block that is configured to determine that the first state change is followed by the second state change, without an intervening primitive, and forego transmitting the first state change to the screen-space pipeline in response.

7. The graphics subsystem of claim 6, wherein the state filter block is further configured to determine that a third state change is followed by no primitives that overlap the first cache tile, and foregoing transmitting the third state change to the screen-space pipeline in response.

8. The graphics subsystem of claim 4, wherein the state filter block is further configured to determine that the first state identity is the same as the second state identity.

9. The graphics subsystem of claim 1, further comprising:
a second tiling unit; and
a second screen-space pipeline associated with the second tiling unit,
wherein the crossbar unit is further configured to transmit a second set of primitives interleaved with a second set of state change commands to the second tiling unit, and
wherein the second tiling unit is configured to:
record a second initial state associated with the second set of primitives,
transmit to the second screen-space pipeline one or more primitives in the second set of primitives that overlap the first cache tile,
transmit the second initial state to the second screen-space pipeline, and
transmit to the second screen-space pipeline one or more primitives in the second set of primitives that overlap the second cache tile.

10. The graphics subsystem of claim 1, wherein recording the first initial state comprises recording only state information that is associated with state identifiers referenced by the first set of state change commands.

11. The graphics subsystem of claim 1, wherein the first tiling unit is further configured to:
perform a flush operation comprising generating a cache tile batch that includes primitives that overlap each cache tile in a plurality of cache tiles;
receive a primitive included in the first set of primitives; and
record a second initial state.

12. The graphics subsystem of claim 1, wherein each value of the first initial state corresponds to a corresponding bit, the first tiling unit is further configured to set the corresponding bit corresponding to each of the one or more values of the first initial state that changed when processing the first cache tile via the first screen-space pipeline, and the command to restore only the one or more values of the first initial state that changed is based on the corresponding bits that have been set.

13. A computing device for managing screen-space state information, comprising:
a graphics subsystem, comprising:
a first tiling unit;
a crossbar unit configured to transmit a first set of primitives interleaved with a first set of state change commands to the first tiling unit; and
a first screen-space pipeline associated with the first tiling unit,
wherein the first tiling unit is configured to:
record a first initial state associated with the first set of primitives,
transmit to the first screen-space pipeline one or more primitives in the first set of primitives that overlap a first cache tile,
determine one or more values of the first initial state that changed when processing the first cache tile via the first screen-space pipeline,
transmit a command to the first screen-space pipeline to restore only the one or more values of the first initial state that changed when processing the first cache tile to the first initial state, and
transmit to the first screen-space pipeline one or more primitives in the first set of primitives that overlap a second cache tile.

14. The computing device of claim 13, wherein the first tiling unit is further configured to record the first initial state upon receiving an earliest primitive in the first set of primitives from the crossbar unit.

15. The computing device of claim 14, wherein the first initial state comprises state information reflective of state associated with the first screen-space pipeline when the first tiling unit receives the earliest primitive.

16. The computing device of claim 13, wherein:
a first state change in the first set of state change commands is configured to specify a first state identity and a first state value and a second state change in the first set of state change commands is configured to specify a second state identity and a second state value, and
the first tiling unit is further configured to transmit the first state change and the second state change to the screen-space pipeline with the one or more primitives that overlap the first cache tile.

17. The computing device of claim 16, wherein:
the first tiling unit includes a state filter block that is configured to determine that the first state change is followed by the second state change, without an intervening primitive, and forego transmitting the first state change to the screen-space pipeline in response, and
wherein the state filter block is further configured to determine that a third state change is followed by no primitives that overlap the first cache tile, and foregoing transmitting the third state change to the screen-space pipeline in response.

18. The computing device of claim 13, wherein:
the graphics subsystem further comprises:
a second tiling unit; and
a second screen-space pipeline associated with the second tiling unit,
wherein the crossbar unit is further configured to transmit a second set of primitives interleaved with a second set of state change commands to the second tiling unit, and
wherein the second tiling unit is configured to:
record a second initial state associated with the second set of primitives,
transmit to the second screen-space pipeline one or more primitives in the second set of primitives that overlap the first cache tile,
transmit the second initial state to the second screen-space pipeline, and
transmit to the second screen-space pipeline one or more primitives in the second set of primitives that overlap the second cache tile.

19. The graphics subsystem of claim 13, wherein recording the first initial state comprises recording only state information that is associated with state identifiers referenced by the first set of state change commands.

20. A method for managing screen-space state information, comprising:
receiving a first set of primitives interleaved with a first set of state change commands;
recording a first initial state associated with the first set of primitives;
transmitting one or more primitives in the first set of primitives that overlap a first cache tile;
determine one or more values of the first initial state that changed when processing the first cache tile via the first screen-space pipeline;
transmitting a command to restore only the one or more values of the first initial state that changed when processing the first cache tile to the first initial state; and transmitting one or more primitives in the first set of primitives that overlap a second cache tile.

21. The method of claim 20, wherein:
recording the first initial state comprises recording the first initial state upon receiving an earliest primitive in the first set of primitives.

22. The method of claim 21, wherein the first initial state comprises state information reflective of state associated with a first screen-space pipeline when the earliest primitive is received.

23. The method of claim 20, wherein:
a first state change in the first set of state change commands is configured to specify a first state identity and a first state value and a second state change in the first set of state change commands is configured to specify a second state identity and a second state value, and
further comprising:
transmitting the first state change and the second state change with the one or more primitives that overlap the first cache tile.

24. The method of claim 23, further comprising:
determining that the first state change is followed by the second state change, without an intervening primitive, foregoing transmitting the first state change in response;
determining that a third state change is followed by no primitives that overlap the first cache tile; and
foregoing transmitting the third state change in response.

25. The method of claim 20, wherein recording the first initial state comprises recording only state information that is associated with state identifiers referenced by the first set of state change commands.

\* \* \* \* \*